United States Patent [19]

Folmer

[11] Patent Number: 5,403,423
[45] Date of Patent: Apr. 4, 1995

[54] METHOD FOR FORMING DETAILS AND ADHESIVE BONDING OF SHEET METAL AND COMPOSITE ASSEMBLIES

[76] Inventor: Carroll W. Folmer, 29781 Pebble Beach Dr., Sun City, Calif. 92586

[21] Appl. No.: 95,656

[22] Filed: Jul. 21, 1993

[51] Int. Cl.6 .................................. B32B 31/04
[52] U.S. Cl. .................................. 156/245; 156/382
[58] Field of Search ............ 156/583.3, 493, 382, 156/285, 245; 264/314; 29/469.5; 72/63; 228/44.3

[56] References Cited

U.S. PATENT DOCUMENTS

| | | | |
|---|---|---|---|
| 2,416,137 | 11/1947 | Auxier et al. | 156/382 |
| 2,696,184 | 5/1951 | Demarest | 113/44 |
| 3,025,208 | 9/1957 | Geiger | 156/382 |
| 3,071,853 | 1/1963 | Price et al. | 228/44.3 |
| 3,701,190 | 10/1972 | Stone | 72/63 |
| 3,996,019 | 12/1976 | Cogan | 228/193 X |
| 3,996,091 | 12/1976 | Daunt et al. | 156/382 X |
| 4,889,276 | 12/1989 | Cadwell et al. | 228/181 X |

*Primary Examiner*—Kenneth J. Ramsey
*Attorney, Agent, or Firm*—Charles C. Logan, II

[57] ABSTRACT

Rubber bladders are prepared rapidly and cost effectively and secured to a heater core to adhesive bond at temperatures up to 500° F., sheet metal, thermoplastic, and thermoset assembly shapes.

3 Claims, 8 Drawing Sheets

METHOD FOR FORMING DETAILS AND ADHESIVE BONDING OF SHEET METAL AND COMPOSITE ASSEMBLIES

CROSS-REFERENCE TO RELATED APPLICATIONS

This invention is related to my patent application "A METHOD OF HEAT ASSISTED SHEET METAL FORMING IN 360 DEGREE SHAPES", Ser. No. 95,109, filed concurrently.

This application is also related to my application, Ser. No. 95,108, filed concurrently and entitled A METHOD FOR SHEET METAL AND THERMOPLASTIC ADHESIVE BONDED ASSEMBLIES AND BRAZED BONDED ASSEMBLIES IN 360° SHAPES.

BACKGROUND OF THE INVENTION

1. Field of the Invention

This invention relates to the adhesive bonding of shapes for the aerospace and related industries.

2. Description of the Prior Art

There are factories and subcontractors who produce Adhesive Bond Assemblies, usually in autoclaves. They have established a history of success in preparing for and producing Adhesive Bond Assemblies in autoclaves.

Although they have established a successful history, bonding in an autoclave suffers from a number of disadvantages:

(a) The bond assembly details must be bagged and sealed with the tooling in order to pull a vacuum to apply pressure during bonding. This is expensive, recurring, material cost and requires hand labor.

(b) After placing the bond assembly in the autoclave, it can take a considerable amount of time for the autoclave to come up to temperature.

(c) It is very difficult to assure an even distribution of temperature within the autoclave and quite often large fans are used to stir the air in an effort to attain said distribution.

(d) Since efficiencies demand that several assemblies be bonded at the same time in an autoclave, it is sometimes necessary to wait until the conditions necessary to bond are met. An example would be if you want a bond cycle of 350° F. at 35 psi and the next cycle is 250° at 70 psi. Autoclave time must be scheduled.

U.S. Pat. No. 2,696,184 illustrates a thick rubber bladder that requires pouring to a pattern. My invention using sheet stock rubber, usually silicone, laid up on a metal cylinder or cone reduces the span time from approximately 2 weeks to 2 days to produce a bladder. The bladder of U.S. Pat. No. 2,696,184 is pump filled to form sheet metal blanks.

U.S. Pat. Nos. 2,416,137 and 3,025,208 reflect bag molding and an apparatus for adhesive bonding, but both are very expensive methods of manufacture.

My patent will limit the amount of gas or fluid to bond. The sheet stock rubber bladder can be produced rapidly and be mechanically lock sealed to a heater core. Heat and pressure can then be applied to bond. The details can be perforates such as those shown in U.S. Pat. Nos. 4,292,356 of Whitemore, 4,465,725 of Riel, 4,990,391 of Veta, and 5,041,323 of Rose as the pressure is contained within the bladder.

SUMMARY

Accordingly the reader will see that a multitude of materials can be bonded in this facility cost effectively in that Sheet stock rubber bladders are laid up on sheet metal cylinders or cones in a short span time and secured to a heater core with special end sealing, cost effectively.

The amount of gas or fluid required to move the rubber bladder to the bond assembly is limited as the heater core is sized to the bladder, fills up space, and resist the pressures.

Recurring cost of bagging and preparing assemblies for an autoclave is eliminated as the bladder is reusable.

Temperature distribution is evenly distributed by a design that surrounds the bond panel and the facility comes up to temperature rapidly.

One, two, or more assemblies can be bonded in the facility as it is designed for triple die translation.

Perforated sheet metal and composites are bonded as the bladder contains the gas used for pressure.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

BRIEF DESCRIPTION OF THE DRAWINGS

Reference Numerals In Drawings

14 Overhead Transfer Beam
16 Part loading Winch
18 Case and Die Winch
20 Controller and Recorder
22 Hydraulic Triple Die Positioning Base
24 Heater Bank Mount Ring
26 Preform
26B Formed Shape of Outer Skin From 26
26C Formed Shape of Inner Skin From 26
28 Case
30 Die
30B Die Similar to 30
32 Heater Core Holder
34 Heating Elements
36 Upper Transition Block
38 Lower Transition Block
40 Upper Seal Retainer (Alternate)
42 Lower Seal Pressure Resistor (Alternate)
44 O-Ring (Alternate)
46 Inflatable Seal (Alternate)
48 Inflatable Seal Pressure Tube (Alternate)
50 Forming Pressure Tube
52 Compression Seal (Alternate)
54 Rubber Bladder
54B Rubber Bladder—After From
56 Hydraulic Dual Die Positioning Base
58 Base
60 Core—Main Body
60B Dense Core—Upper End
60C Dense Core—Lower End
62 Bond Die Heating Element

Figure 1:
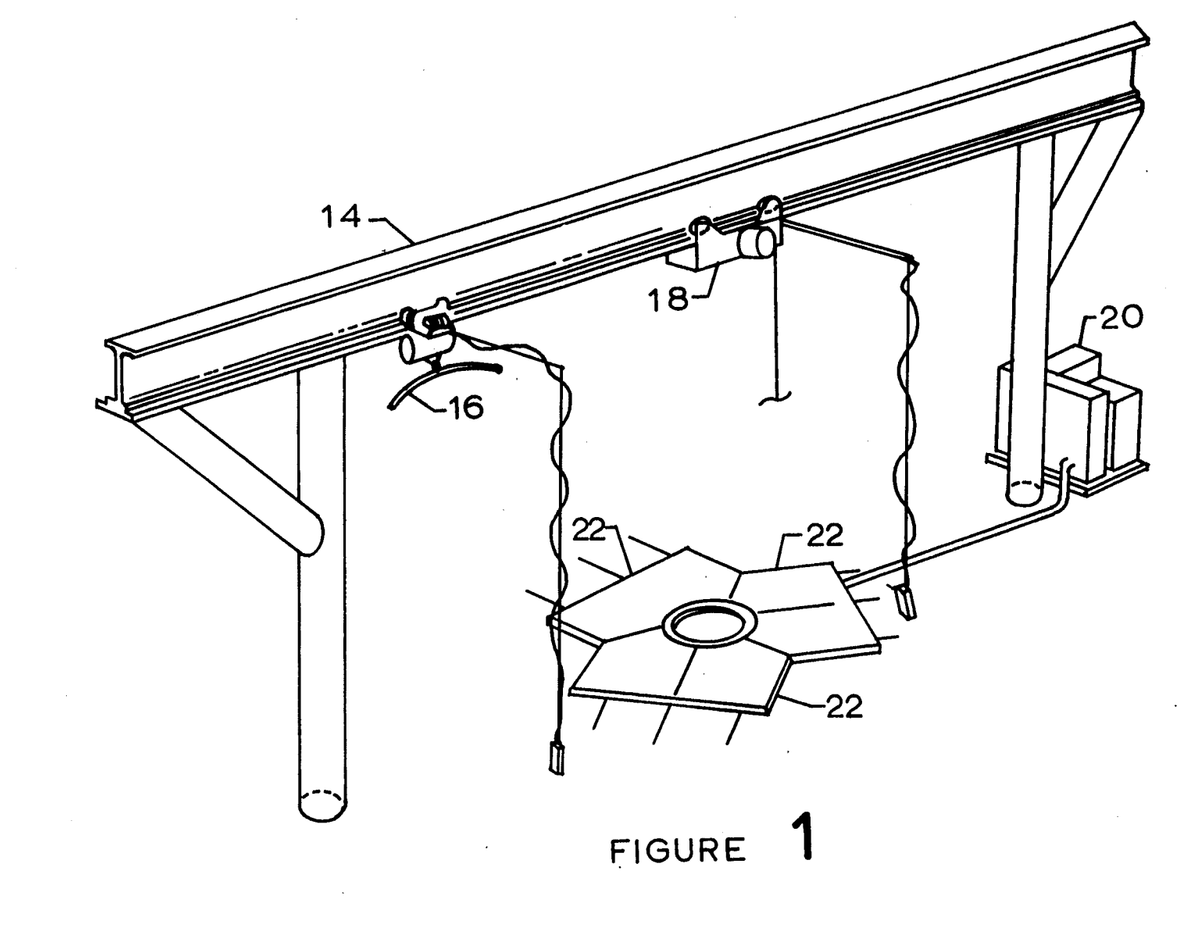
FIG. 1 is a schematic perspective view illustrating an overview of the facility.
Figure 2A:
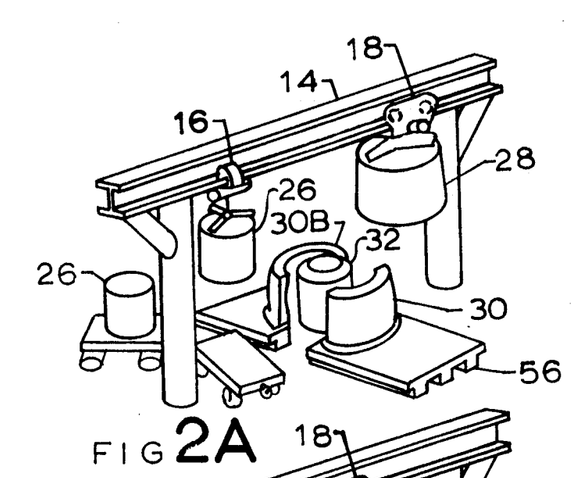
FIG. 2A is a schematic view showing the step involving lifting the bond details from the cart.
Figure 2B:
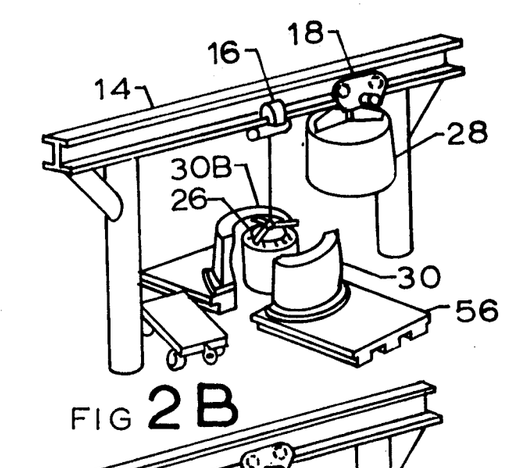
FIG. 2B is a schematic view showing the step when the bond details are secured to the dies and are closed.
Figure 2C:
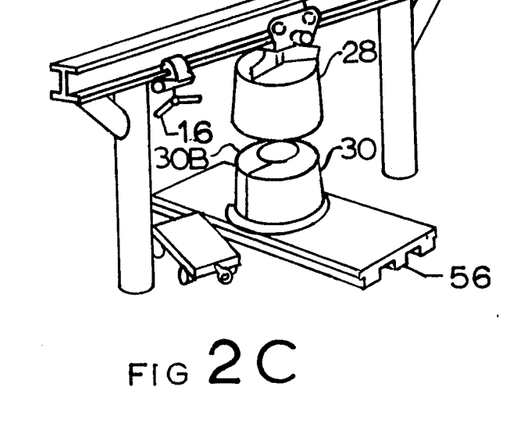
FIG. 2C is a schematic view showing the step of lowering the case around the dies and securing it in place.
Figure 2D:
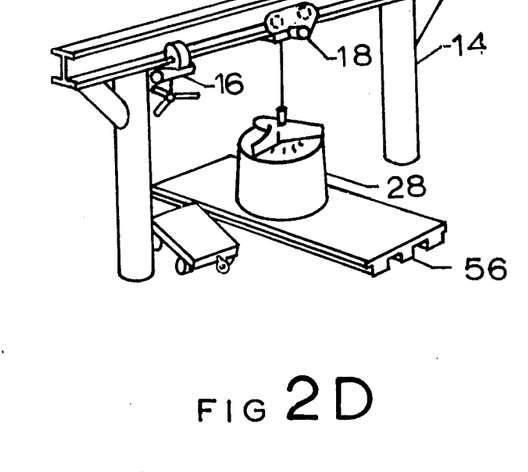
FIG. 2D is a schematic view showing the step when the temperature and pressure are applied.
Figures 3A, 3C:
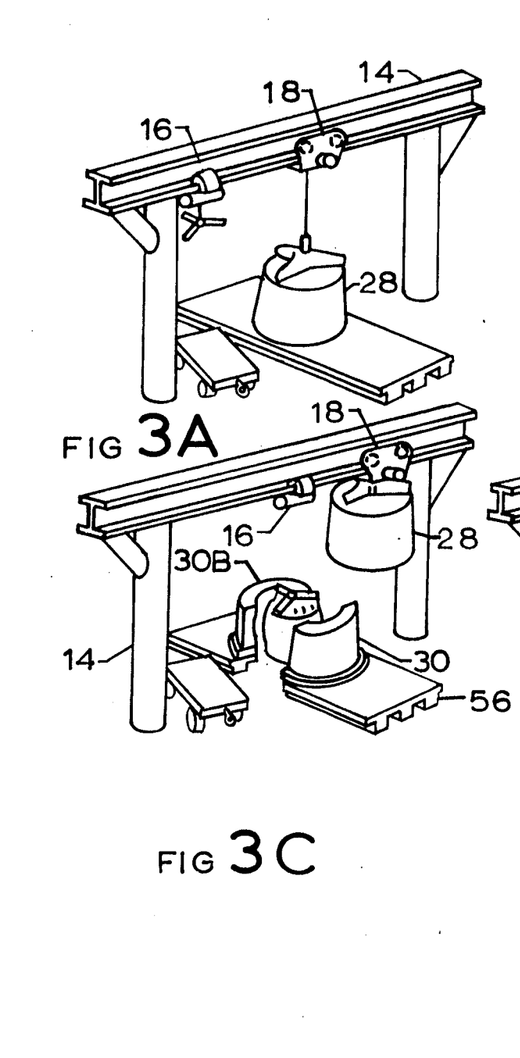
FIG. 3A is a schematic view showing the step when the bond assembly is cured at a timed interval.
FIG. 3C is a schematic view showing when the dies are translated open.
Figures 3B, 3D:
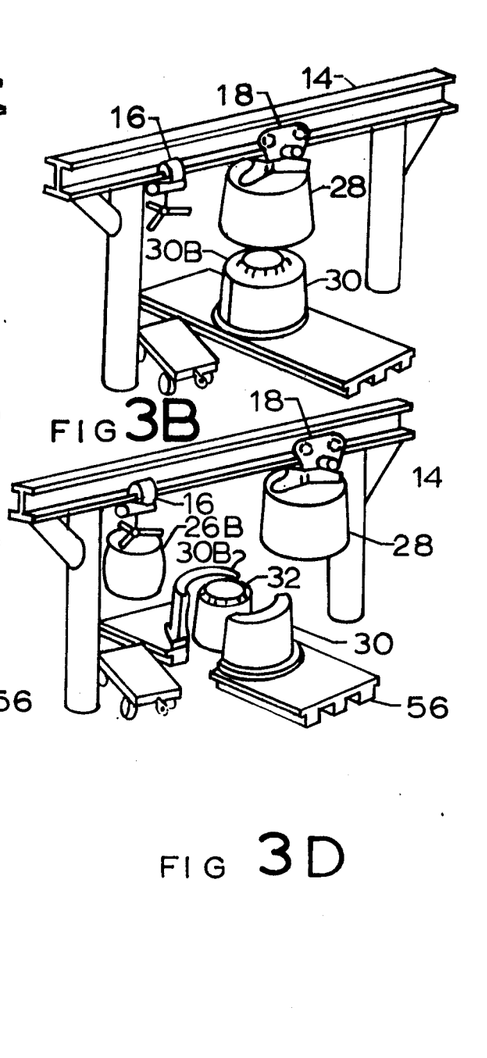
FIG. 3B is a schematic view showing the step of removing the case.
FIG. 3D is a schematic view showing when the bonded assembly is removed.

FIGS. 1 through 3 are schematic and are intended to present an overview of the facility. FIGS. 4 through 9 concern adhesive bonding. Most figures deal with dual dies as that is the most common usage. Dies are currently planed as singular, dual and triple all using a rubber bladder to adhesive bond. Mechanical, compressible, and inflatable sealing is defined for end sealing of the bladder with the primary mode being mechanical.

FIG. 1 shows an overall view of the hot forming and bonding facility with hydraulic positioning bases 22 for three dies to provide horizontal movement of dies. The bases 22 index to a heater core holder mount ring 24. Three dies offer an ability to remove bond assemblies that would be trapped on a single die or on dual dies. Winches mounted to an over head frame 14 provide vertical movement. One winch 16 is for lightweight duty. The second winch 18 is for heavy cases and dies. The controller recorder 20 controls the application of heat, pressure, and cooling over time.

FIGS. 2A-2D show the dual die configuration which will be the most common application. Bond assembly details are placed on each die. The dies 30 and 30b are translated into position, using the hydraulic dual die positioning base 56, and the case 28 is placed over the dies by the heavy duty winch 18. The case fits firmly to the dies as it resist the bonding gas pressure. Gas pressure is then applied to the bladder to inflate and bond shapes.

FIGS. 3A-3D are a continuation of the dual die bonding and removal sequence. Gas pressure in the bladder 54 will cause the bond details to be secured against the dies and cured into a single entity. The case 28 is removed. The dies 30 and 30b are translated away and assemblies are available.

Figure 4:
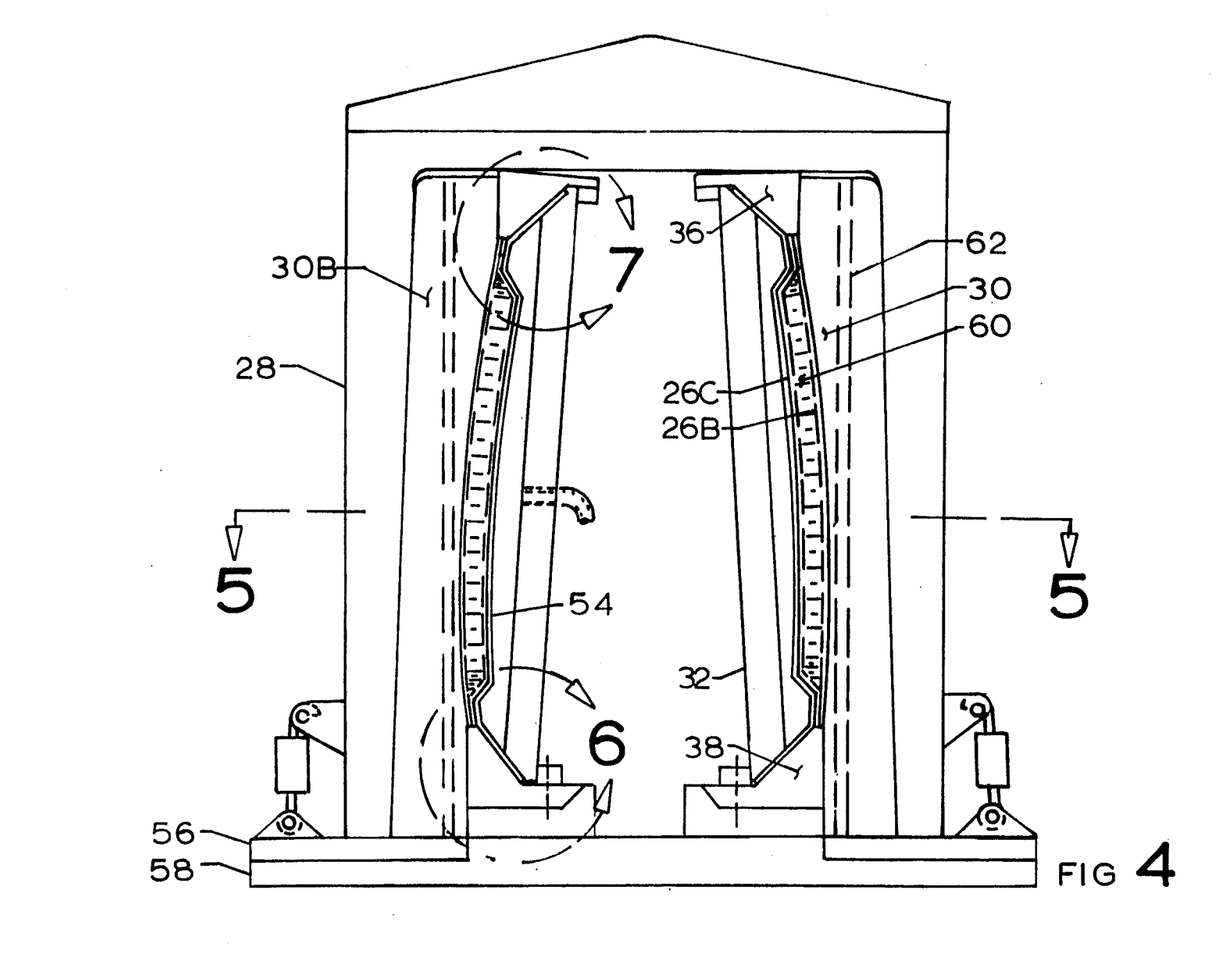
FIG. 4 is a schematic composite view of a typical aerospace sheet metal adhesive bonded shape inside the facility.

FIG. 4 is a composite view of a typical aerospace sheet metal adhesive bond shape inside the facility. The outer sheet metal shape 26B has been end trimmed to fit against the die-bond tools 30 and 30B. Adhesive is added. The main body core 60, the upper end dense core 60B and the lower end dense core 60C are put into place. The inner sheet metal shape 26C is trimmed and placed against the core and secured. The dies 30 and 30b are translated into the closed position and the case 28 is installed. The case 28 is locked to the hydraulic die positioning base 56. The proper bonding temperature is activated. The proper bonding pressure is applied to the inner side of the removable silicon rubber bladder 54. The bladder will contact 26B as heat and pressure are applied to effect a bond. It should be noted that the sheet metal shapes referred to could be perforated, be thermoplastic, or be precurred thermoset shapes as the gas is contained within the bladder. In fact thermoset laminates can be laid up on bond tools and bonded using the bladder.

Figures 5A, 5B:
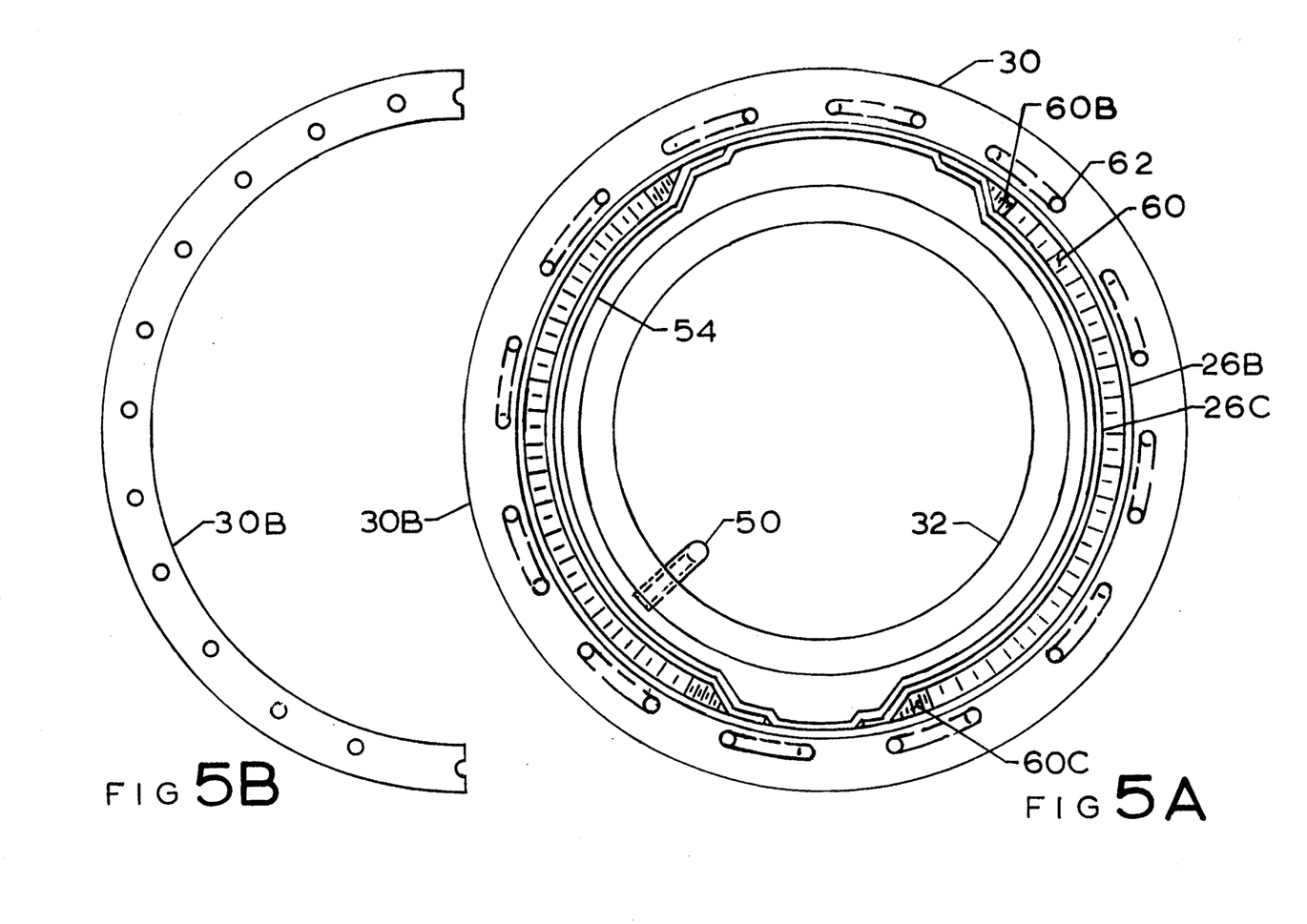
FIG. 5 is a cross sectional view taken along lines 5—5 of FIG. 4.

FIG. 5 is a section cut through the facility and shows two bond shapes bonded by one bladder 54. It depicts formed shapes 26B and 26C separated by the core pieces 60, 60B, and 60C.

Figure 6:
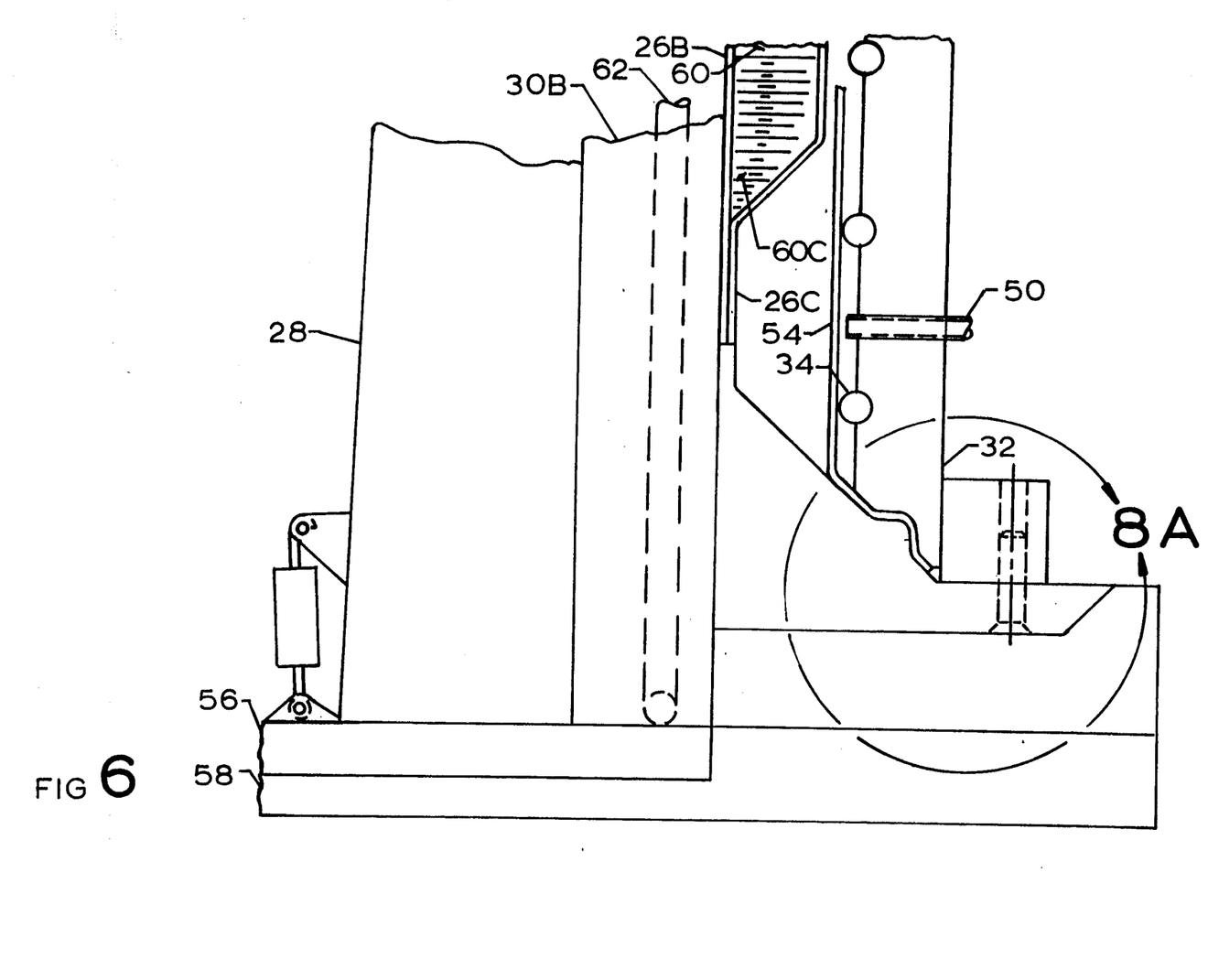
FIG. 6 is an enlarged view of the structure identified by the arc 6 in FIG. 4.

FIG. 6 is an enlargement of the lower end. It shows the lower transition ring 38 secured to the heater core holder 32. As the transition ring 38 is screwed to the holder 32 it captures the end of the bladder 54 and seals it tight. This will be the primary method of end sealing the bladder. The heater core holder 32 is aligned and secured to the holder 24. The case 28 is shown as a tight fit around the dies 30 and 30B. The case is held to the hydraulic die positioning base 56, which is indexed to the base 58, with a hook lock actuator. The case 28 resist all the pressures transmitted by the bladder 54 to bond sheet metal shapes.

Figure 7:
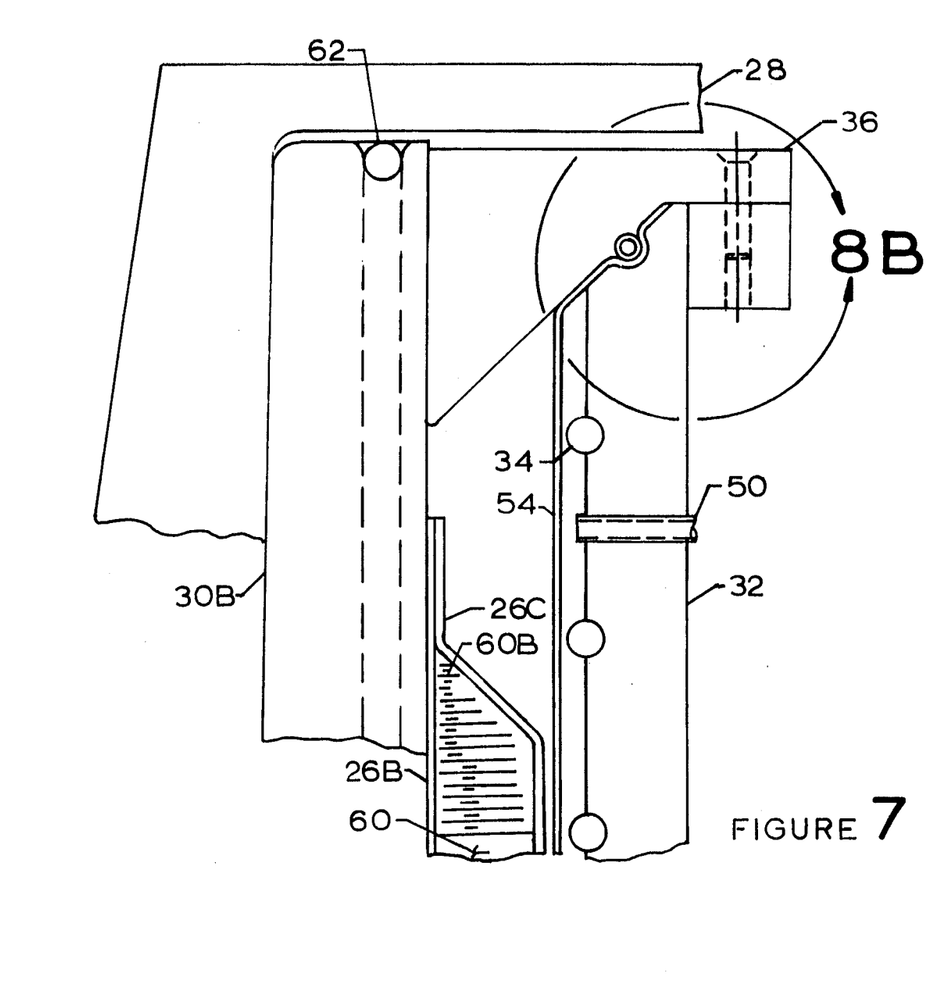
FIG. 7 is an enlarged view of the structure identified by the arc 7 in FIG. 4.

FIG. 7 is an enlargement of the upper end. The upper transition ring 36 lets the bladder transition smoothly, avoiding tears as it is inflated and heated to apply pressure to the bond shape. FIG. 7 shows the upper transition ring 36 secured to the heater core holder 32. As the transition ring 36 is screwed to the older it captures the end of the bladder 54 and seals it tight by compressing an o-ring. The o-ring seal is an alternate design to the one shown in FIG. 6. Forming gas inflates the bladder through delivery tube 50. Heat is available from both heating elements 34 or 62.

Figures 8A, 8B:
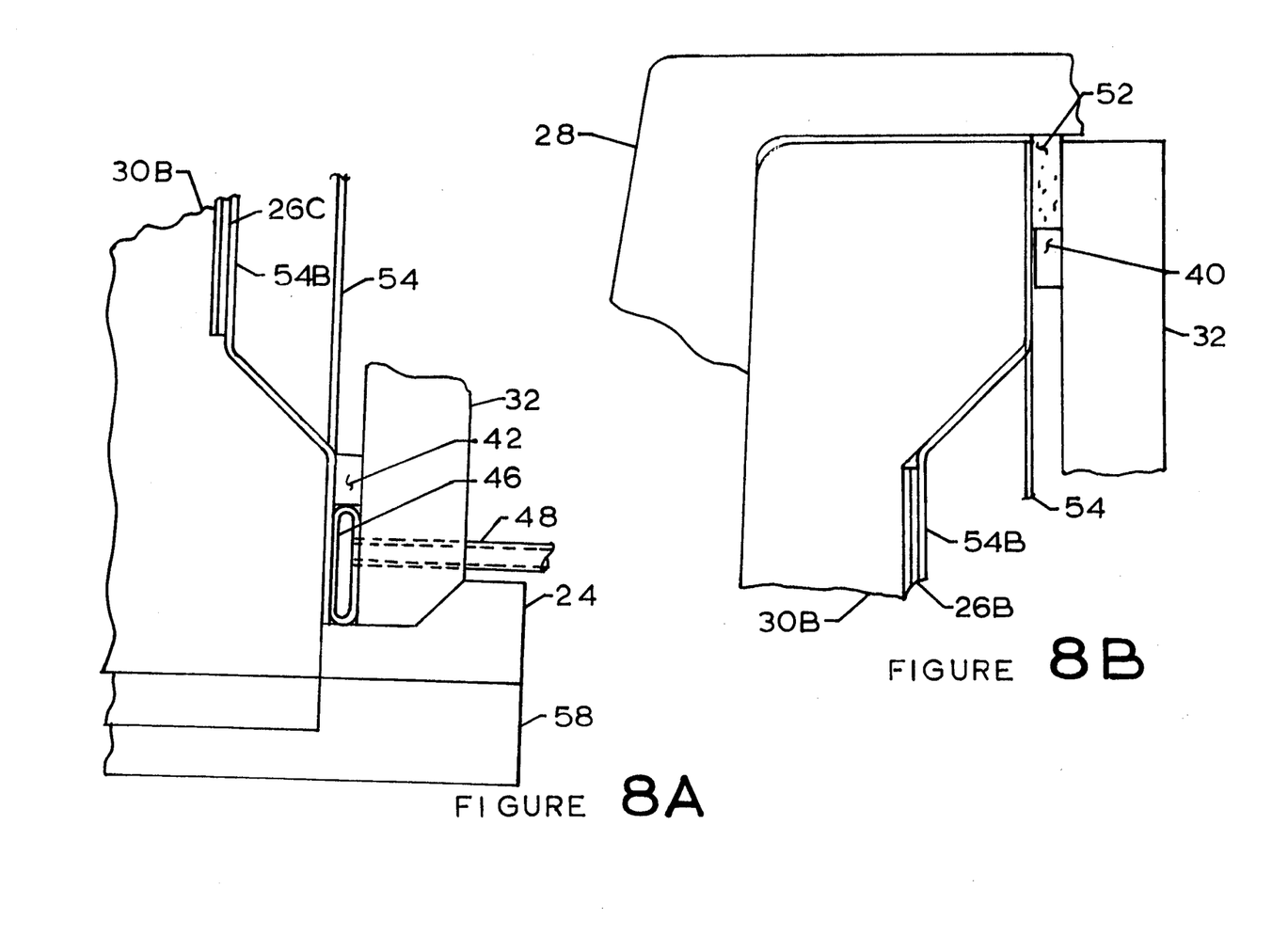
FIGS. 8A and 8B illustrate two alternative sealing methods.

FIGS. 8A and 8B show two alternate sealing methods. The upper view shows a compressible seal 52 bonded to the bladder 54 and compressed by the translation of the dies into the bonding position. The lower view shows an inflatable seal 46 that would be inflated after the dies have been translated into position.

This facility has been designed to provide several services in a small area. This is the same facility described in the patent application "A METHOD OF HEAT ASSISTED SHEET METAL FORMING IN 360 DEGREE SHAPES", Ser. No. 095,109, filed concurrently. 360° metal shapes or less can be bonded in this facility. Sheet metal, thermoplastic or precured thermoset systems can be bonded in this system. The following are the steps necessary to bond an adhesive bonded shape using a silicon rubber bladder system for sheet metal shapes, thermoplastic shapes and thermoset epoxy systems.

(a) A removable silicon rubber bladder 54 is installed to a heater core holder 32 which is installed to the mount ring 24.

(b) The outer sheet metal shape 26B is end trimmed to fit against the die-bond tools 30 and 30B. Adhesive is added. The main body core 60, the upper end dense core 60B and the lower end dense core 60C are put into place and adhesive added. The inner sheet metal shape 26C is trimmed and placed against the core which has adhesive added and secured. The dies 30 and 30b are translated into the closed position and the case 28 is installed. The case 28 is locked to the hydraulic die positioning base 56. The proper bonding temperature is activated. The proper bonding pressure is applied to the inner side of the removable silicon rubber bladder 54. The bladder will contact 26B as heat and pressure are applied to effect a bond. It should be noted that the sheet metal shapes referred to could be perforated, thermoplastic, or precurred thermoset shapes as the gas is contained within the bladder. In fact thermoset laminates can be laid up on bond tools and bonded using the bladder.

(c) After bonding, the case 28 is removed with the winch 18. The dies 30 and 30B are translated. The bond shape or shapes are removed with the winch 16. The bond assemblies can be trimmed and the facility is ready for the next operation.

I claim:

1. A method for forming sheet metal adhesive bonding assemblies in 360 degree shapes comprising the steps of:
   a) taking a 360 degree multi-purpose heater core holder having a bottom surface and securing said bottom surface to a base;
   b) installing a 360 degree rubber bladder on said heater core holder, said rubber bladder having a top end and a bottom end;
   c) taking a 360 degree inner skin that has been previously formed from a preform in die assembly A and installing it over the 360 degree rubber bladder on said multi-purpose holder, said inner skin having an outer surface and an inner surface;
   d) taking a 360 degree outer skin that has been previously formed from a preform in a die assembly B and installing it back in die B, said outer skin having an outer surface and an inner surface;
   e) taking honeycomb core members and applying adhesive to them and to the inner surface of said outer skin and fitting said honeycomb core members to the inner surface of said outer skin;
   f) closing die assembly B around said outer skin thus allowing die assembly B to become a bonding tool and said inner skin to become a pressure vessel;
   g) installing a case over said dies and securing it to said base;
   h) applying heat and pressure from said heater core holder to said inner skin which is in contact with the honeycomb core members laid up on said outer skin to effect an adhesive bonded assembly.

2. The method for forming sheet metal adhesive bonding assemblies in 360 degree shapes as recited in claim 1 wherein said rubber bladder is formed from sheet stock rubber that has been formed into a 360 degree member having either a cylindrical or conical shape.

3. The method for forming sheet metal adhesive bonding assemblies in 360 degree shapes as recited in claim 1 wherein the heat applied in step (h) is less than 500 degrees F. in order to prevent the rubber bladder from melting.

* * * * *